Patented June 19, 1934

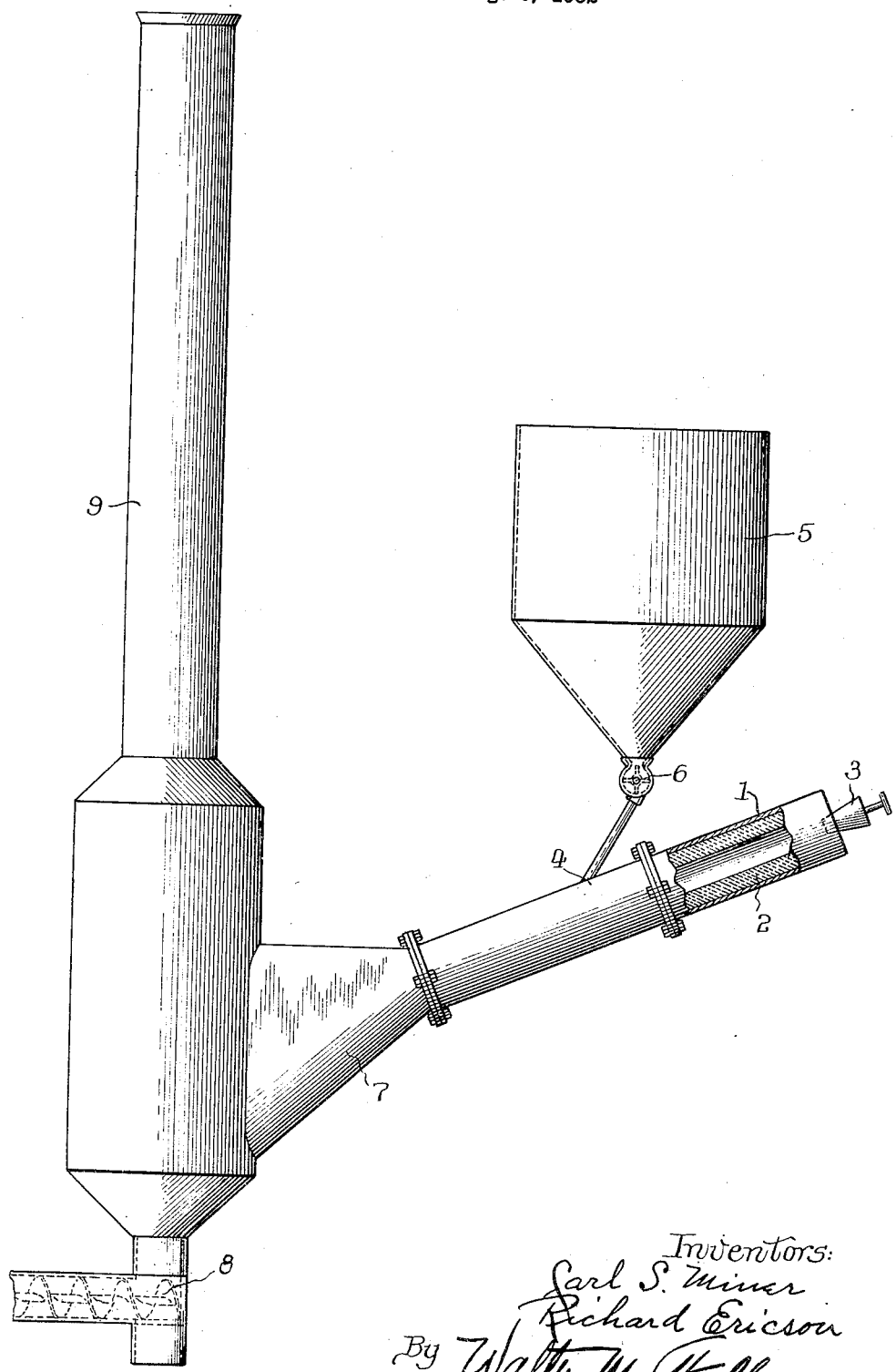

1,963,276

UNITED STATES PATENT OFFICE 1,963,276

EXPANDED VERMICULITE MANUFACTURE

Carl S. Miner, Glencoe, and Richard Ericson, Chicago, Ill., assignors, by mesne assignments, to National Vermiculite Products Corporation, Chicago, Ill., a corporation of Illinois Application August 8, 1932, Serial No. 627,906

4 Claims. (Cl. 252—1)

By a method discovered by one of us and fully disclosed and claimed in the pending patent application Serial No. 544,046, the ore vermiculite can be expanded into a plastic, non-friable form by an explosion process employing a "gun" similar to that in use for the manufacture of puffed cereals.

In view of such discovery that a plastic, expanded vermiculite of that kind can be made by the explosion method, we have conducted an extensive investigation to determine the possibility of making such a product by processes more economical than the gun method referred to.

As a result of this research, we have not only discovered a simple and relatively inexpensive mode of producing plastic, expanded vermiculite, but we have also found that, by properly applying this new procedure, we obtain a product which is not only plastic, but which is more fully or more completely expanded; that is to say, of a lower apparent density than distended or enlarged vermiculite prepared by processes commercially used in the art heretofore.

Our investigation has disclosed that, if any given particle of vermiculite be of such dimensions that it can be rapidly heated throughout its entire extent to the temperature necessary for expansion, maximum distension or swelling for that particular type of vermiculite will result.

If such entirely expanded vermiculite particle is removed from the source of heat immediately after enlargement, it will be found to be plastic; but, if it is allowed to remain in the hot zone for any considerable period after expansion has been completed, the plasticity will be greatly reduced or entirely lost.

The commercial utility of vermiculite is primarily due to its capacity for expansion, and, consequently, its industrial value is to a considerable extent proportional to the degree of expansion.

Therefore, one of the most important results of our invention is the production of expanded vermiculite of lower apparent density than that manufactured by methods known and used in the past.

A completely plastic product, that is, one whose particles are all plastic and substantially non-friable, is best made by careful grading of the pieces of raw vermiculite in relation to their dimensions, and the vermiculite must be substantially uniform in at least one dimension.

On the other hand, however, maximum expanded volume can be obtained without such careful grading, since extremely rapid heating of the particles to expansion temperature is the main essential for large volume, whereas quick removal of the expanded material from the heat zone after expansion is requisite for plasticity.

Therefore, if there are some small and some large particles, the small ones will be heated to the expansion temperature first, but they must remain in the hot zone until all the particles, large and small, are expanded, with the result that many of the small particles will be retained in the hot zone long enough to render them somewhat friable.

Preferably, therefore, we choose such conditions for the operation as will insure complete expansion of all particles rather than full plasticity for all particles, since the utmost expansion is not only the more valuable result commercially, but it is also easier of accomplishment.

Many types of mechanical equipment may be satisfactorily utilized for performing our new process, as, for instance, a revolving, hot disc onto which the vermiculite particles are dropped and from which they are immediately removed by a scraper or other equivalent means; or a hot, inclined screen, the vibration and inclination of which are such as to remove the vermiculite from the hot zone immediately after its expansion.

Another style of apparatus which can be effectively employed, but which is operated on the batch principle, is a reciprocating, horizontal, metal sheet or screen operating in such a manner that a charge of vermiculite can be added to the hot surface quickly and removed expeditiously after expansion.

We have found, however, that an especially economical and efficient means for carrying out the novel and improved process on a large scale consists in introducing the vermiculite directly into a gas or oil flame, the gases of combustion of which have sufficient velocity to convey the expanded material away, and, in the use of such an appliance, the vermiculite remains in the hot zone preferably only long enough to complete its expansion and is removed from such zone immediately after the expansion has been accomplished.

An apparatus for carrying out this method is shown more or less diagrammatically in the single figure of the accompanying drawing forming a part of this specification, and to which reference should be had in connection with the following detailed description.

In the appliance illustrated in such drawing, a steel tube 1, equipped with a suitable, high-heat-resisting lining 2, is placed preferably in a suitable, downwardly-sloping position, but satisfactory operation is possible with either a horizontal or upwardly-inclined tube.

At the upper end of such tube, we provide an oil-burner 3 operated with fuel-oil and compressed-air, the flame from the burner passing downwardly through tube 1, forming a hot zone therein, the products of combustion flowing out through a stack 9 to the atmosphere.

The unexpanded vermiculite from a storage bin 5 is introduced at a uniform rate through a revoluble feeder 6 of appropriate design into the tube 1 and the flame within it at the point 4, which should be the region of maximum flame velocity and temperature, the vermiculite being fed in such a manner as to cause a minimum disturbance of the flame.

The entering vermiculite is quickly expanded by the heat and conveyed by the flame and combustion gases through the tube 1 into a larger stack connection or extension 7, where it separates from the hot gases in the lower portion of the stack and drops down into a conveyor 8 of any suitable type, by which it is removed automatically from the apparatus.

This separation of the expanded vermiculite from the hot combustion gases is due in part to the reduced velocity, and hence lessened conveying capacity, of the gases in the flaring larger connection 7 and the bottom portion of the upright stack and possibly also in a measure by reason of the change of direction of flow of such gases.

Under some circumstances, it may be desirable to use a dust-collector for the stack in order to catch the fine particles of vermiculite.

In practicing our process with this equipment, we heat the interior of the cylinder to approximately white heat at the point 4 by means of the burner 3, the gases from which flow through the tube at such a rate that the expanded vermiculite particles are quickly conveyed along with them and then pass into the conveyor 8, a satisfactory period for the expanding operation ordinarily being several seconds.

For a given temperature and quantity of heat, the number of seconds to enlarge or expand the vermiculite properly is a function of the dimensions of its individual particles, particularly their thickness.

For example, in the above-described apparatus, the following conditions normally will give a suitable plastic material.

The flame is an air-fuel-oil torch operating at fifteen gallons of fuel-oil per hour, the steel tube 1 being twelve inches inside diameter and having a two-inch lining of heat-refractory insulation, the tube being set at a downward angle of twenty-two degrees from the horizontal.

The distance from 4, the point of entrance of the vermiculite, to the back wall of the stack is eight feet, and the vermiculite size used is that which will pass through a No. 4 screen and be held on a No. 8 screen, the range of thickness of the flakes being between .075 inch and .035 inch, the vermiculite being introduced at the rate of about two thousand pounds per hour.

The material will be well expanded or enlarged, and will be plastic if cooled immediately after being removed from the hot zone. Such cooling may be effected by any well-known means, such as a blast of air.

It is possible to control the conditions of expansion, particularly the time and intensity of the heating period, so that any size particle, say up to .1 inch thickness or more, can be expanded to a suitable plastic state.

When a product of less plasticity is not objectionable, it has been found advantageous, from the standpoint of economy of operation, to increase the dimensional limits of the vermiculite pieces suggested in the above description.

Particles of vermiculite including sizes from one-fourth inch to dust have been expanded simultaneously, and, in such cases, it will be noticed that the larger size particles are more plastic than the smaller ones, because of the greater or excessive heating which the latter receive, but such variation in plasticity is not a serious disadvantage for many uses of the product, such as an insulation fill, and the augmented expansion obtained by this method is a decided advantage.

When a high degree of plasticity is not desired in the product, it is feasible to utilize successfully vermiculite graded by ordinary screen methods without particular regard to thickness of particle.

Of course, it is to be understood that the dimensions of the apparatus described may be modified in accordance with the capacity desired and other factors involved.

Another method of practicing our invention for the production of plastic expanded vermiculite, and which is especially applicable to large area particles, is carried out practically as follows:

Vermiculite of suitable particle size, which may include relatively large particles, is dropped onto a hot, plane surface of metal which has a rapidly reciprocating motion, and, after a sufficient heat period to cause the desired expansion, which time limit may suitably be several seconds or less, the vermiculite is removed by air blast, a rake, a scraper, or the like, the process consisting in a repetition of such cycle.

Particles of .025 inch thickness give unusually satisfactory results by this process when exposed to a temperature of 850° Centigrade for about eight seconds, and particles up to .1 inch thickness may be properly expanded according to the principles of this invention, in this type of equipment, but somewhat higher temperature or longer heating period will be found desirable in the case of such thicker particles.

It will be obvious to those skilled in this art that the principles and modes of procedure which we have discovered and have applied in the methods presented can be utilized in a wide range of ways without loss or sacrifice of the benefits or advantages accruing from the invention.

In certain deposits, vermiculite is found in large flakes, sometimes several square inches in area and over an inch in thickness, or even larger, and such size pieces can be very successfully expanded by the method presented in the co-pending patent application referred to, but for the process of the present invention relatively-thin particles should ordinarily be used, the exact dimensions of the flakes depending upon the type of expanding apparatus employed, the size and plasticity of the enlarged vermiculite particles desired, the temperature, the heating period, and the variety of vermiculite used as raw material.

Obviously, it is impossible to specify exact procedures which will produce optimum results with all types of vermiculite, but it is possible nevertheless to lay down certain general principles, as has been done herein, which will enable those skilled in the art to obtain the full benefit of our invention.

To recapitulate: (a) the vermiculite should be of as nearly uniform particle dimensions, particularly thickness, as practical; (b) the vermiculite should be introduced directly into a zone sufficiently hot to cause immediate, i. e. nearly explosive, expansion; (c) the vermiculite should be removed from the hot zone as quickly as possible after expansion is complete; and (d) specific processing conditions, such as temperature, period of heating, and type of apparatus, are determined primarily by the size of particle and the degree of plasticity desired in the finished product.

We have found that the whole process of expansion and removal can be performed in substantially less than one second for vermiculite which passes a No. 10 screen, and that if such product is allowed to remain in the hot zone for as much as one minute, the plasticity is greatly reduced.

In the case of the thicker flakes mentioned above, several seconds may be required for complete expansion.

Our new process has great advantages of convenience and economy, as well as of quality of product, especially in the case of those varieties of vermiculite which occur naturally in relatively small, thin flakes which can be used without further disintegration.

Because of the high speed at which the processing operation is performed, an extremely large quantity of finished product can be made per unit of time by the employment of a comparatively small apparatus.

It is, therefore, possible to mount such an expanding appliance as the one shown in the accompanying drawing on a truck and to expand the vermiculite at the point of use.

It thus becomes convenient to expand the vermiculite, cool it, and blow or otherwise conduct it into the space, as in walls, where it is to serve as insulation, without involving the expense of packing and transporting the extremely-bulky, expanded vermiculite from the point of manufacture to the place of ultimate use.

This is a measure of economy of material importance in connection with building operations, and we consider it one of the important phases of our invention.

Our new type of expanded vermiculite is satisfactory for practically all of the present uses for which expanded vermiculite has been found valuable, and it has the added advantages inherent in its greater plasticity and lower apparent density.

It will, of course, be understood that our invention is applicable also to other types of heat-expansible materials in addition to those included under the general term vermiculite.

The vermiculite treated by this process may contain non-expansible impurities, and, in such instances, such foreign matter passes along with the expanded vermiculite from which it may be segregated in any one of several well-known methods, such as by means of an air-blast.

It is also possible to combine the cleaning and expanding operations and perform them simultaneously in the same machine in cases where this is desirable.

I claim:

1. The method of producing plastic expanded vermiculite, consisting in heating the vermiculite sufficiently rapidly to effect its practically maximum expansion and substantially immediately cooling the expanded vermiculite quickly and adequately enough to prevent it from becoming materially friable.

2. The method of expanding vermiculite, consisting in introducing the vermiculite into a flame hot enough to cause practically immediate expansion of the vermiculite and conveying the expanded material away by the combustion gases, the velocity of said gases being sufficiently great to remove the expanded material from the hot zone rapidly enough to prevent it from becoming materially friable.

3. The method of treating vermiculite of different size particles, consisting in rapidly heating the vermiculite to cause practically immediate expansion thereof and removing the swelled material from the hot zone before the larger expanded particles become materially friable.

4. The method of expanding vermiculite, consisting in selecting vermiculite particles having at least one dimension not over .1 inch, subjecting the selected vermiculite to substantially instantaneous heating to produce quick expansion thereof, and removing the enlarged vermiculite from the hot zone immediately after expansion has taken place.

CARL S. MINER.
RICHARD ERICSON.